Patented Feb. 23, 1932

1,846,122

UNITED STATES PATENT OFFICE

MAX ALBERT KUNZ, OF MANNHEIM, AND KARL KOEBERLE AND ERICH BERTHOLD, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

HALOGENATED N-BENZANTHRONEPYRAZOLANTHRONES

No Drawing. Application filed April 24, 1930, Serial No. 447,110, and in Germany April 27, 1929.

The present invention relates to the halogenation of N-benzanthronepyrazolanthrones.

We have found that N-benzanthronepyrazolanthrones can be halogenated in a manner easily carried out in practice by treating them with an inorganic halogenating agent in the absence of a diluent. Halogenating catalysts, in particular non-metallic catalysts, such for example as iodine, sulphur and compounds thereof, are preferably added to the reaction mixture. As halogenating agents the free halogens may be employed as well as chlorsulphonic acid, sulphuryl chloride and such fused anhydrous metal halides as dissociate at elevated temperatures splitting off halogen, such as for example the halides of aluminum, iron, antimony, mercury and the like. We wish our present invention to be understood as not comprising the co-employment of several of these inorganic halogenating agents and the appended claims are to be read with this limitation. The process according to our present invention consists therefore in treating the N-benzanthronepyrazolanthrones with free halogen at ordinary or slightly elevated temperatures, for example by grinding the initial material in a stream of chlorine or in bromine or sulphuryl chloride, or heating the initial material with one of the said other inorganic halogenating agents at temperatures at which they split off halogen which in the case of chlorsulphonic acid is at least about 65° C., the temperature to be used with the anhydrous metal halides is different with the single metal halides, and is for example at least about 100° C. in the case of iron and antimony chloride, whereas with aluminum chloride the temperature should be at least about 140° C. The melting points of the said metal halides may be lowered by the addition of suitable substances, for example the halides of alkali and alkaline earth metals. The process according to the present invention is particularly suitable for further halogenating N-benzanthronepyrazolanthrones already containing halogen either by introducing further amounts of the halogen already present or a different halogen. Moreover, the process has the further advantage that the products are obtained in a state in which they may directly be used for dyeing.

The dyestuffs containing bromine, or bromine and chlorine or iodine, or all three halogens in the molecule thus obtained usually dissolve in concentrated sulphuric acid giving violet colorations, give green blue vats and usually dye cotton greenish marine blue shades having excellent properties of fastness. In addition they are valuable intermediate products for the manufacture of new dyestuffs. The corresponding leuco esters or leuco preparations may be easily obtained from the dyestuffs according to the usual methods.

The crude dyestuffs may be purified if necessary by the usual methods as for example by crystallization from or boiling up with solvents of high boiling point or by crystallization from sulphuric acid by way of the oxonium sulphate or by treatment with oxidizing agents as for example by treatment in the form of their aqueous pastes with alkali or alkaline earth metal hypochlorites.

The following examples will further illustrate the nature of this invention, but the invention is not restricted to these examples. The parts are by weight.

Example 1

45 parts of N-benzanthronepyrazolanthrone in 450 parts of chlorsulphonic acid are heated for several hours at from 60° to 65° C. after the addition of 10 parts of iodine. When a sample taken out obviously contains chlorine the whole is allowed to cool, if necessary diluted with concentrated sulphuric acid, poured into water, boiled for a short time and filtered by suction while hot. The dyesuff obtained which by analysis is a dichloro-N-benzanthonepyrazolanthrone dyes cotton marine blue shades which are more greenish than those of the initial material and differs in this respect form all the chloro derivatives of this class of bodies hitherto known, a difference which may be attributed to the difference in the position of the chlorine atoms in the molecule. The yield of the dyestuff, which is obtained in a form in which it is ready for use, is excellent. The reaction product when dry is a blue powder which dissolves in concentrated sulphuric acid giving a violet coloration and gives a blue vat, and dyeings therefrom have an excellent fastness to light and weather.

A chlorobromo derivative giving still more greenish dyeings is obtained by brominating the reaction product, for example by the addition of 20 parts of bromine to the solution in chlorsulphonic acid.

*Example 2*

1200 parts of bromine are poured over 445 parts of finely divided N-benzanthronepyrazolanthrone, the whole being then ground for about 15 hours at between 20° and 30° C. in a ball mill after the addition of 10 parts of iodine. When the desired amount of bromine has been taken up which may be ascertained by a sample furnishing greenish navy blue shades, the excess of bromine is distilled off, the residue taken up is a dilute caustic soda solution, the precipitate filtered off, washed until neutral and dried. The dibromo-N-benzanthronepyrazolanthrone thus obtained is a blue powder dissolving in concentrated sulphuric acid to give a violet solution and dyes cotton excellently fast greenish navy blue shades from a blue greenish vat.

If the bromination is carried out without the addition of iodine a reaction product is obtained dyeing slightly more reddish shades.

*Example 3*

120 parts of sulphuryl chloride are poured while stirring over 44.5 parts of N-benzanthronepyrazolanthrone to which 4 parts of iodine have been added. The reaction mixture is then warmed to between 45° and 50° C. and stirring continued at the said temperature for several hours, whereupon the reaction mixture is worked up in the usual manner. The chloro-N-benzanthronepyrazolanthrone thus obtained in an excellent yield is a dark blue powder dissolving in concentrated sulphuric acid giving a violet solution and dyeing clear excellently fast navy blue shades from a green blue vat.

*Example 4*

52 parts of monobromo-N-benzanthronepyrazolanthrone obtainable by treating N-benzanthronepyrazolanthrone in oleum of 5 per cent strength with the calculated amount of bromine are dissolved while stirring in 520 parts of chlorsulphonic acid and heated at between 65° and 70° C. after the addition of 10 parts of selenium until a sample shows the desired content of chlorine. The reaction mixture is then allowed to cool and worked up in the usual manner. The chlorobromo-N-benzanthronepyrazolanthrone thus obtained is a violet blue paste and furnishes on cotton strong clear navy blue shades of very good fastness from a green blue vat.

*Example 5*

62 parts of dibromo-N-benzanthronepyrazolanthrone obtainable by brominating N-benzanthronepyrazolanthrone in oleum are heated at between 80° and 90° C. in 600 parts of chlorsulphonic acid after the addition of 6 parts of iodine until 2 atoms of chlorine have been taken up per each molecule of the initial material. The reaction mixture is then allowed to cool and worked up as usual. The dichlorodibrome-N-benzanthronepyrazolanthrone thus obtained in an excellent yield and a state of great purity is a violet blue paste and a dark blue powder when dried, crystallizes from solvents of high boiling point, such as for example nitrobenzene in violet blue needles, dissolves in anhydrous sulphuric acid to give a violet solution and dyes the vegetable fibre from a green blue vat strong clear navy blue shades of excellent fastness.

What we claim is:

1. A process of producing halogen derivatives of N-benzanthronepyrazolanthrone, which comprises treating a N-benzanthronepyrazolanthrone with an inorganic halogenating agent in the absence of a diluent.

2. A process of producing halogen derivatives of N-benzanthronepyrazolanthrone, which comprises treating a N-benzanthronepyrazolanthrone with an inorganic halogenating agent in the absence of a diluent and in the presence of a halogenating catalyst.

3. A process of producing halogen derivatives of N-benzanthronepyrazolanthrone, which comprises treating a N-benzanthronepyrazolanthrone with chlorsulphonic acid at a temperature above about 65° C.

4. A process of producing halogen derivatives of N-benzanthronepyrazolanthrone, which comprises treating a N-benzanthronepyrazolanthrone with chlorsulphonic acid at a temperature above about 65° C in the presence of a non-metallic halogenating catalyst.

5. As new articles of manufacture N-benzanthronepyrazolanthrones containing at least two different halogens, dissolving in concentrated sulphuric acid to give blue red solutions and dyeing cotton from green blue vats navy blue shades.

6. As a new article of manufacture dichlorodibromo-N-benzanthronepyrazolanthrone forming a violet blue paste and a dark blue powder, dissolving in anhydrous sulphuric acid to give a violet solution and dyeing cotton from a green blue vat strong clear navy blue shades.

In testimony whereof we have hereunto set our hands.

MAX ALBERT KUNZ.
KARL KOEBERLE.
ERICH BERTHOLD.